United States Patent [19]

Schmidt et al.

[11] Patent Number: 4,813,977
[45] Date of Patent: Mar. 21, 1989

[54] ADSORPTIVE NITROGEN GENERATION UTILIZING MULTIPLE ADSORPTION BEDS

[75] Inventors: William P. Schmidt; Ravi Kumar; Alan D. Abel, all of Allentown, Pa.

[73] Assignee: Air Products and Chemicals, Inc., Allentown, Pa.

[21] Appl. No.: 138,983

[22] Filed: Dec. 29, 1987

[51] Int. Cl.$^4$ .............................................. B01D 53/04
[52] U.S. Cl. .......................................... 55/26; 55/31; 55/33; 55/58; 55/62; 55/68; 55/74; 55/75
[58] Field of Search .................... 55/25, 26, 31, 33, 35, 55/58, 62, 68, 74, 75

[56] References Cited

U.S. PATENT DOCUMENTS

| | | | |
|---|---|---|---|
| 3,313,091 | 4/1967 | Berlin | 55/58 |
| 3,338,030 | 8/1967 | Feldbauer, Jr. | 55/25 |
| 3,638,398 | 2/1972 | Domine et al. | 55/25 |
| 3,923,477 | 12/1975 | Armond et al. | 55/25 |
| 3,957,463 | 5/1976 | Drissel et al. | 55/25 |
| 4,013,429 | 3/1977 | Sircar et al. | 55/33 |
| 4,144,037 | 3/1979 | Armond et al. | 55/58 |
| 4,168,149 | 9/1979 | Armond et al. | 55/21 |
| 4,222,750 | 9/1980 | Gauthier et al. | 55/58 |
| 4,264,340 | 4/1981 | Sircar et al. | 55/25 |
| 4,477,265 | 10/1984 | Kumar et al. | 55/26 |
| 4,539,019 | 9/1985 | Koch | 55/33 X |
| 4,614,525 | 9/1986 | Reiss | 55/58 X |
| 4,711,645 | 12/1987 | Kumar | 55/33 X |

FOREIGN PATENT DOCUMENTS

| | | | |
|---|---|---|---|
| 216712 | 9/1986 | Japan | 55/25 |
| 1437344 | 5/1976 | United Kingdom | 55/25 |

Primary Examiner—Robert Spitzer
Attorney, Agent, or Firm—Geoffrey L. Chase; William F. Marsh; James C. Simmons

[57] ABSTRACT

A process is described for nitrogen recovery from air using vacuum swing adsorption. The process minimizes capital costs by reducing or eliminating gas storage vessels and reduces power requirements by operating without an air feed compressor or elevated pressure feed, whereby air feed is induced by vacuum conditions achieved by pressure equalization between parallel adsorption beds. Alternatively, a minor amount of oxygen product can be recovered.

17 Claims, 3 Drawing Sheets

FIG. 3A

| 140 | AIR FEED | RINSE | EVACUATION | | REPRESS | IDLE |
|---|---|---|---|---|---|---|
| 142 | REPRESS | IDLE | AIR FEED | RINSE | EVACUATION | |
| 144 | EVACUATION | | REPRESS | IDLE | AIR FEED | RINSE |

TIME ⟶

FIG. 3B

| 58 | AIR FEED | RINSE | EVACUATION | REPRESS |
|---|---|---|---|---|
| 60 | RINSE | EVACUATION | REPRESS | AIR FEED |
| 62 | EVACUATION | REPRESS | AIR FEED | RINSE |
| 64 | REPRESS | AIR FEED | RINSE | EVACUATION |

TIME ⟶

ADSORPTIVE NITROGEN GENERATION UTILIZING MULTIPLE ADSORPTION BEDS

TECHNICAL FIELD

The present invention is directed to the field of vacuum swing adsorptive separation of air. Specifically, the present invention is directed to vacuum swing adsorptive separation of air to produce a nitrogen product of high purity.

BACKGROUND OF THE PRIOR ART

The prior art is well developed in the field of gas separations using adsorptive beds, wherein a more selectively adsorbed gas specie is retained on the beds while a less selectively adsorbed gas specie is allowed to pass through the bed. Adsorptive separation technique allow for the separation and recovery of an individual product, dual products, or potentially in combination with a complex arrangement of adsorptive beds, multiple products can be obtained.

Various techniques for separation of air to recover nitrogen, oxygen or nitrogen and oxygen are known in the prior art.

In U.S. Pat. No. 4,013,429 a process is set forth for the adsorptive separation of air using two parallel sets of beds including pretreatment beds for the removal of water and carbon dioxide and main beds for the selective adsorption of nitrogen product. This process utilizes a series of pressure or volume variable receiving vessels, which constitute an expense and an operational liability. In addition, this process utilizes both compressors and vacuum pumps, which require power input for both. Finally, the process utilizes segregated pretreatment and main beds for differential regeneration.

A similar system is disclosed in U.S. Pat. No. 3,957,463. This process is for recovery of oxygen. The process requires an expansible oxygen receiver, as well as compression feed equipment and vacuum desorption equipment.

In U.S. Pat. No. 4,264,340, a process is disclosed for the recovery of product nitrogen which has been dried and cleaned of carbon dioxide and hydrocarbons. Again, compression feed, vacuum recovery and expansible receivers are an integral part of the process.

The present invention overcomes the disadvantages of the prior art by avoiding power consumption of feed air compression and the need for capital intensive and operational limiting storage vessels in a process as will be set forth below utilizing vacuum swing adsorption.

BRIEF SUMMARY OF THE INVENTION

The present invention is directed to a process for the production of high purity nitrogen from air using a plurality of parallel adsorption beds which comprises, drawing ambient air through the feed end of the first bed of adsorbent by connecting the effluent end of said bed to the effluent end of a parallel bed, which is presently fully evacuated, so as to selectively adsorb nitrogen on said first bed of adsorbent and allow oxygen to pass through said first bed, cocurrently rinsing said first bed with high purity nitrogen to remove any co-adsorbed oxygen or void space oxygen from said bed, countercurrently evacuating said first bed to a subatmospheric pressure to recover high purity nitrogen product and rinse gas for another of said plurality of beds presently undergoing the rinse step, countercurrently repressurizing said first bed by connecting the effluent end of said first bed at its subatmospheric pressure at the end of the evacuation step with the effluent end of another of said plurality of beds presently undergoing the ambient air adsorption step and continuing this series of steps with the plurality of beds to form a continuous process for production of high purity nitrogen.

Preferably the nitrogen gas recovered from one parallel bed undergoing evacuation is used in part directly as rinse gas for another of the parallel beds undergoing the rinse step.

Preferably any water and carbon dioxide contained in the feed ambient air is adsorbed in an initial portion of the adsorbent packing in the plurality of parallel beds, wherein the initial portion of the adsorbent contains an adsorbent specific to the selective removal of water and carbon dioxide in contrast to the remainder of the bed, which is packed with an adsorbent selective to the adsorption of nitrogen over oxygen.

The ambient air feed is conducted over a pressure variation range of from approximately 12.7 psia to approximately 14.7 psia. The evacuation step is performed down to a vacuum level of approximately 50–250 torr.

The nitrogen product derived from the process will preferably have a purity of at least 95.0% and up to approximately 99.9%. Preferably, four parallel adsorptive beds are utilized. Alternatively, three parallel adsorptive beds are utilized.

Preferably, the four steps of the process comprising air feed, rinse, evacuation and repressurization occupy an equal period of time in the overall process. Alternatively, an idle step is included after repressurization, such that the air feed and rinse step, as well as the repressurization and idle step, are equal in time duration as the evacuation step.

Alternatively, a minor amount of oxygen product can be recovered from the process.

BRIEF DESCRIPTION OF THE DRAWINGS

FIG. 3A illustrates a cycle sequence for the three bed system of FIG. 2.

FIG. 3B illustrates a cycle sequence for the four bed system of FIG. 1.

DETAILED DESCRIPTION OF THE INVENTION

Figure 1:
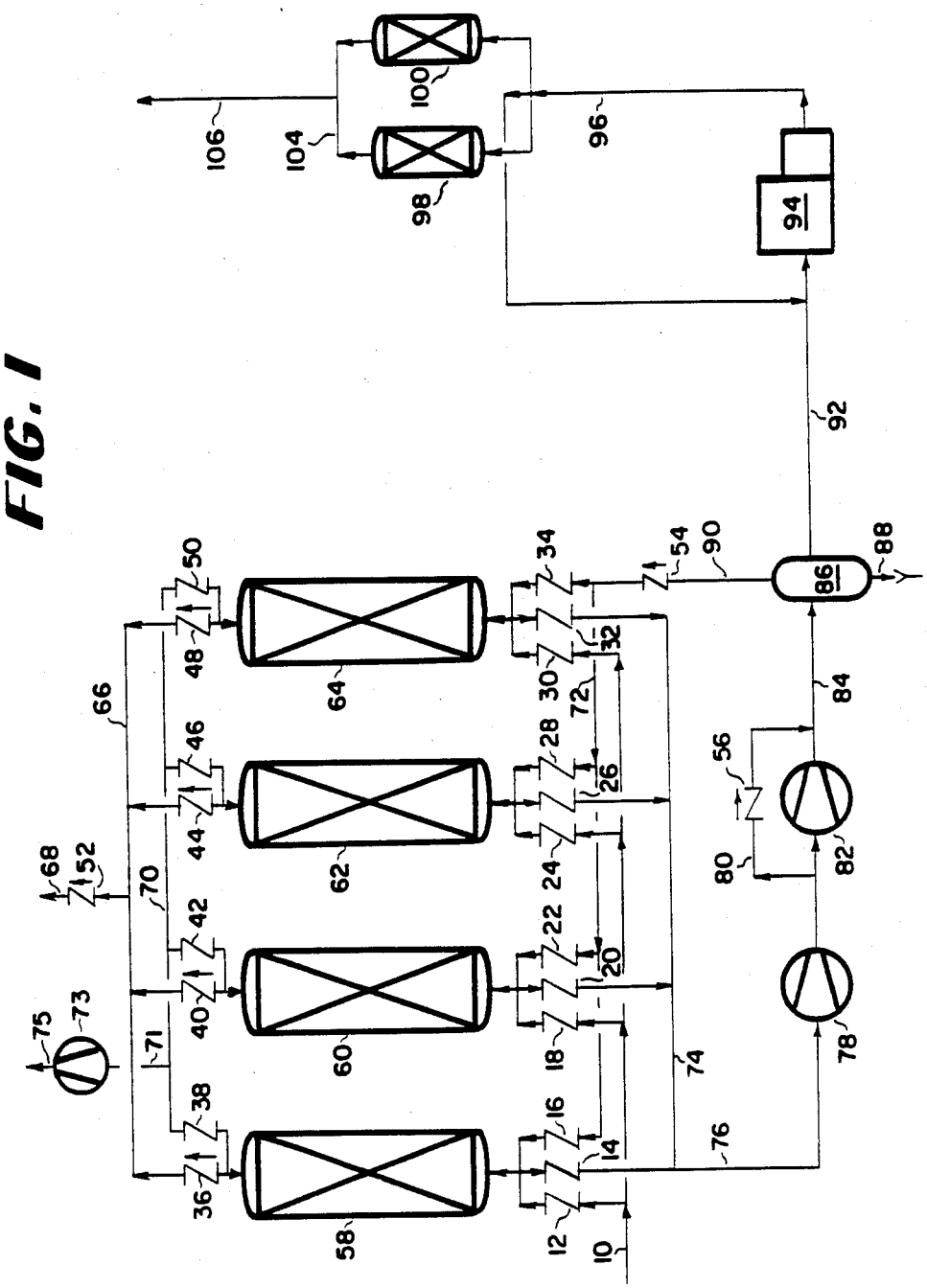
FIG. 1 is a schematic depiction of a preferred embodiment of the present invention. This embodiment utilizes four parallel adsorptive beds and a product drying step.

The present invention overcomes the problem of producing low cost nitrogen in an adsorptive separation. Typically nitrogen production is both energy and capital intensive. Adsorptive processes for producing nitrogen in the past have experienced difficulty in control and efficiency in utilization of power. In the field of pressure swing adsorption, the subfield of vacuum swing adsorption is particularly attractive wherein the process is run between ambient pressure and a certain lower vacuum pressure. Vacuum swing adsorption is more energy efficient than pressure swing adsorption at elevated pressures wherein vacuum swing adsorption requires 0.75 kwh per 100 scf of nitrogen (at a product pressure of 30 psig) in comparison to the energy requirements of the pressure swing adsorption of 1.2 kwh/100 scf of nitrogen.

The present invention, constituting the more power efficient vacuum swing adsorption type, has several advantages over the prior art including the elimination of pretreatment and main beds as separate vessels with the concurrent avoidance of separate repressurization steps. It also eliminates the need for an extended evacuation of the pretreatment adsorbent to insure complete removal of carbon dioxide and water. In addition, the present invention eliminates the need for an oxygen storage tank and optionally can reduce the requirements for a nitrogen storage tank. Most importantly, the present invention avoids the capital cost and power requirements of an air blower or feed compressor by using the vacuum in an adsorptive bed being repressurized to draw air into the bed on air feed, such that the air feed step is operated over much of its cycle under subambient pressure conditions. The process results in a system which can produce 95.0% purity nitrogen and, preferably, 99.9% purity nitrogen product. The several embodiments of the present invention wherein an air blower is avoided produce nitrogen at significantly lower specific powers than the prior art as represented by U.S. Pat. No. 4,013,429. The process of the present invention as set forth in FIG. 1 has a specific power of 0.45 kwh/100 scf of 99.0% nitrogen at 0 psig, or 0.60 kwh/100 scf at 30 psig. The present invention as embodied in FIG. 2 has a specific power of 0.47 kwh/100 scf of 99.0% nitrogen at 0 psig. In contrast, the prior art as represented by U.S. Pat. No. 4,013,429 has a specific power of 0.60 kwh/100 scf of 99.0% nitrogen at 0 psig. Accordingly, it can be seen that the present invention, with the avoidance of an air blower and the use of the vacuum compressor to conduct evacuation and supply air feed as well as rinse gas, along with the elimination of storage vessels, provides a unique process for producing high purity nitrogen at low capital cost and low power requirements.

The present invention will now be described in greater detail with reference to the embodiment illustrated in FIG. 1. Inlet ambient air possibly containing water and carbon dioxide is drawn in through line 10 into open valve 12 to be passed through adsorption bed 58 which is packed in its initial, or in this instance, lower portion with a water and carbon dioxide selective adsorbent such as alumina, silica gel or a zeolite, such as Na-X and is packed in its remaining portion or upper region with a nitrogen selective adsorbent such as a zeolite, such as CaX. The air is drawn through bed 58 by connection of that bed through open valve 38 and open valve 50 via line 70 with bed 64, which has just finished evacuation down to a pressure of approximately 150 torr and is now ready for repressurizing. As the air is drawn through bed 58, line 70 and into bed 64, the air is cleaned of water and carbon dioxide, nitrogen is preferentially and selectively adsorbed out of the air on the adsorbent and oxygen enriched gas passes through line 70 as a repressurization gas into bed 64 to raise its pressure ultimately to approximately ambient pressure conditions. Optionally, a minor amount of oxygen enriched gas, up to 10% of the nitrogen product, can be recovered from line 70 in line 71 by pulling oxygen through vacuum compressor 73 to be recovered as an oxygen-enriched product in line 75. At a fixed time set to avoid a nitrogen breakthrough at the effluent end of bed 58 and full repressurization of bed 64, ambient air feed is terminated and repressurization is also terminated.

At this point in time, bed 58 containing water, carbon dioxide, nitrogen, a small amount of co-adsorbed oxygen and a small amount of oxygen present in the voids space between the adsorbent particles is rinsed cocurrently with high purity nitrogen gas. The nitrogen rinse is introduced into the influent end of bed 58 through open valve 16 via line 72 and one-way valve 54 from line 90 and nitrogen storage vessel 86, which is supplied via line 84 from the evacuation compressors 78 and 82. The nitrogen rinse passes cocurrently through bed 58 to flush out coadsorbed oxygen and voids space oxygen through one-way valve 36 and line 66, wherein the rinse effluent with oxygen contamination is passed through open valve 52 and discharged as a vent waste stream 68.

This nitrogen rinse is derived from bed 60, which has previously undergone a rinse step and is simultaneously being evacuated through open valve 20 and line 74 by the vacuum suction of vacuum compressors 78 and 82, the latter of which is supplied with a by-pass circuit 80 and one-way valve 56, wherein high purity nitrogen of at least 95% nitrogen purity, preferably 99.9% nitrogen purity, is removed in line 84 and supplied to nitrogen storage tank 86. A portion of this nitrogen is used as rinse in bed 58 by passage through line 90 as described above. A certain amount of water is condensed at the higher pressure and is removed through line 88. The remaining high purity nitrogen is removed as product in line 92. When conditions dictate product at elevated pressure and low water or carbon dioxide content, the nitrogen product can be pressurized in compressor 94 and delivered via line 96 to alternating desiccant beds 98 and 100 operated in a known manner wherein dry, pressurized nitrogen is removed in line 104 as product 106. These desiccant beds can be regenerated in any one of a number of ways such as using a dry purge gas, by pressure swing regeneration or by thermal regeneration or a combination of those regenerations. Such a drying step is described in U.S. Pat. No. 4,264,340, the specification of which is incorporated herein by reference.

Bed 58, having just finished rinse for the removal of oxygen contamination, is next placed under countercurrent evacuation ultimately to a subatmospheric pressure of approximately 150 torr to recover high purity nitrogen product and rinse gas to be used for another of the plurality of beds, one of which is undergoing rinse. This evacuation is conducted by opening valve 14 and drawing nitrogen-rich gas countercurrently through line 76 via evacuation compressors 78 and 82, wherein nitrogen is delivered via line 84 to nitrogen storage vessel 86 for nitrogen rinse and nitrogen product, as stated above. While bed 58 is undergoing evacuation, a portion of its nitrogen product is transferred via line 90 and open valves 54 and 34 to provide cocurrent nitrogen rinse to bed 64 which has just come off the air feed step. When bed 58 has reached its fixed time evacuation schedule and arrived at the predesigned vacuum level during that fixed time evacuation, the valve 14 is then closed.

Vessel 58 is then at a subatmospheric pressure of approximately 150 torr and is then used to draw feed ambient air through another vessel by connecting the effluent end of bed 58 with the effluent end of bed 60. This pressure equalization induces repressurization of bed 58 and draws the feed air through bed 60, which has just previously been repressurized. This pressure equalization constituting repressurization and feed air respectively for the two beds, is accomplished by opening valve 38 and valve 42 to allow the vacuum in bed 58 to pull air through bed 60 and line 70 to repressurize bed 58 with oxygen enriched effluent and adsorb nitrogen out of the air being pulled through bed 60 via upen valve 18 and line 10. At the end of a fixed time period designed to fully repressurize bed 58 and to avoid nitrogen breakthrough in bed 60, the valves 38 and 42 are closed. This describes a full cycle sequence for bed 58 with corresponding simultaneous functions with the interrelated parallel beds 60, 62 and 64. It is appreciated that with respect to FIG. 1 and FIG. 3B, each of the beds undergoes a similar sequence of adsorption steps in interrelation with one another. This can be further appreciated from the valve chart, Table 1, illustrated below.

contaminated gas or rinse effluent through open valve 124 and open valve 130 to be vented as waste 138.

After a fixed time period sufficient to remove oxygen content from bed 140, rinse is discontinued and bed 140 is evacuated countercurrently to a subambient pressure level of approximately 150 torr by opening valve 114 and drawing previously adsorbed nitrogen through line 146 by means of vacuum compressors 148 and 150. The second stage of vacuum compression can be by-passed through valve 134. This nitrogen is delivered via line 152 to the nitrogen storage tank 154, which stores nitrogen product and nitrogen rinse for recovery of high purity nitrogen and dispensing of nitrogen rinse, which is recycled to the particular adsorbent bed undergoing rinse. Due to compression, some water and condensi-

TABLE 1

Four Bed Valve Sequence (FIG. 1)

| BED STEP | | | | VALVES | | | | | | | | | | | | | | | | | | | |
|---|---|---|---|---|---|---|---|---|---|---|---|---|---|---|---|---|---|---|---|---|---|---|---|
| 1 | 2 | 3 | 4 | 12 | 14 | 16 | 36 | 38 | 18 | 20 | 22 | 40 | 42 | 24 | 26 | 28 | 44 | 46 | 30 | 32 | 34 | 48 | 50 |
| 0-60 AF | RINSE | EVAC | REP | O | C | C | C | O | C | C | O | O | C | C | O | C | C | C | C | C | C | C | O |
| 60-120 RINSE | EVAC | REP | AF | C | C | O | O | C | C | O | C | C | C | C | C | C | C | O | O | C | C | C | O |
| 120-180 EVAC | REP | AF | RINSE | C | O | C | C | C | C | C | C | C | O | O | C | C | C | O | C | C | O | O | C |
| 180-240 REP | AF | RINSE | EVAC | C | C | C | C | O | O | C | C | C | O | C | C | O | O | C | C | O | C | C | C |

O = Valve Open
C = Valve Closed

Figure 2:
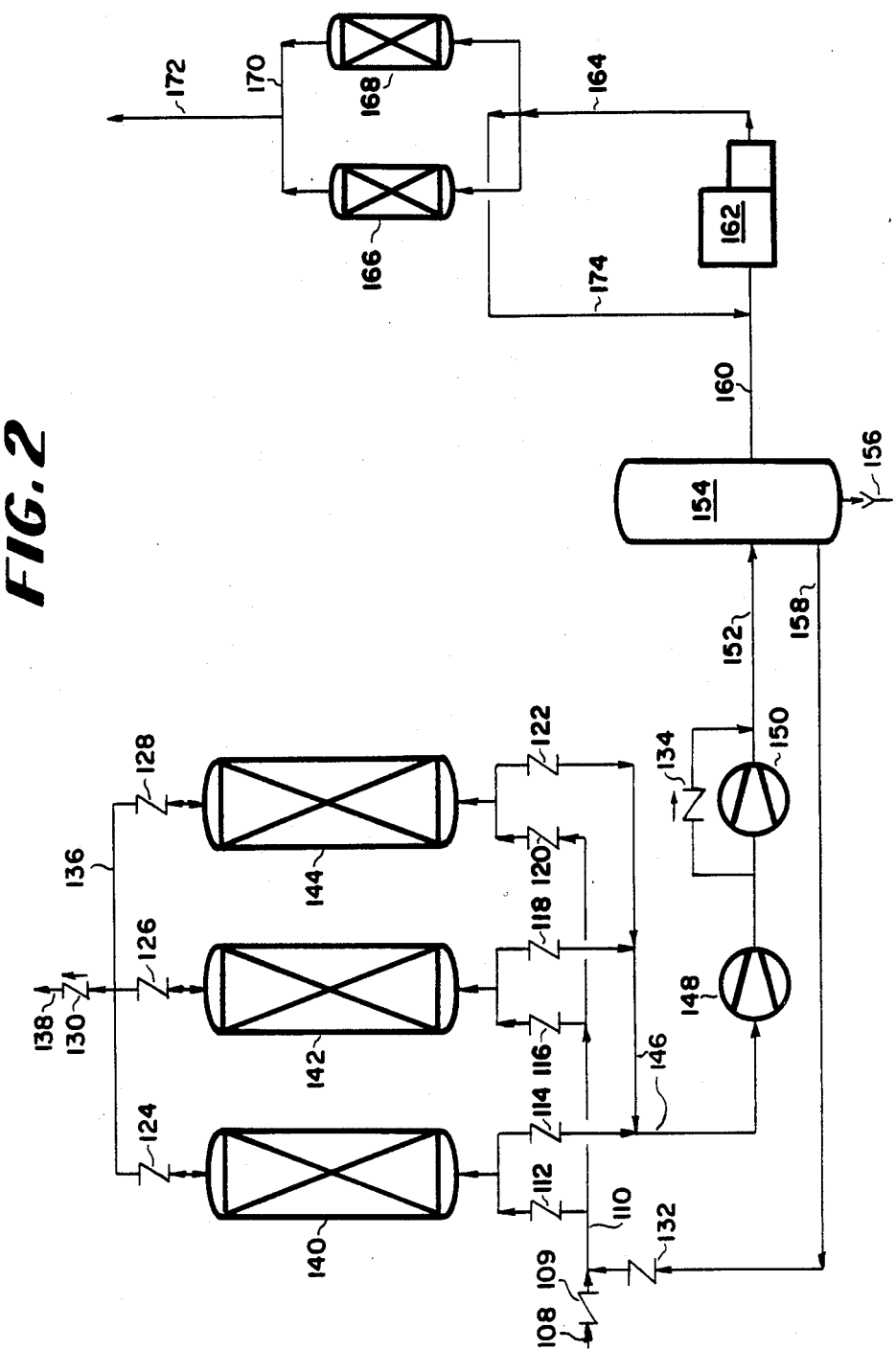
FIG. 2 is a schematic representation of an alternate embodiment to the present invention utilizing three parallel adsorptive beds. This embodiment utilizes a nitrogen storage vessel and product drying step.

An alternate embodiment of the process of the present invention is illustrated in FIG. 2. The process of this alternate embodiment is similar to that of the preferred embodiment, but the cycle sequence includes an idle step, such that the combined steps of air feed and rinse and the combined steps of repressurization and idle are time equivalent to the evacuation step of the various beds. This alternate embodiment will now be described with reference to FIG. 2. Inlet ambient air 108 is introduced through valve 109 and manifold 110. This ambient air is drawn through open valve 112 and into a first adsorbent bed 140 which is packed with an initial or influent portion of water and carbon dioxide selective adsorbent and subsequently in its second or downstream portion with a nitrogen selective adsorbent. The ambient air feed is drawn through bed 140 by having it pressure equalize with a connected, subatmospheric repressurizing bed via open valve 124, manifold 136, valve 126 and repressurizing bed 142. Bed 142 has just previously been evacuated to a lowest most pressure of approximately 150 torr and, during repressurization, reduces the pressure on bed 140, inducing air feed through bed 140 and simultaneous repressurization of bed 142 with oxygen enriched gas from the effluent end of bed 140. This accmplishes countercurrent repressurization of bed 142.

On a fixed time basis the air feed of bed 140 and repressurization of bed 142 are terminated on a basis such that nitrogen does not break through the effluent end of bed 140 and bed 142 is repressurized to approximately feed air pressure conditions. Bed 140 is then rinsed with a high purity nitrogen gas cocurrently in order to remove co-adsorbed oxygen and void space oxygen by passing nitrogen into the influent end of bed 140 cocurrently through valve 112, manifold 110 and open valve 132, which delivers nitrogen via line 158 from a nitrogen storage tank 154. This nitrogen displaces oxygen bles can be removed from the nitrogen storage tank 154 through line 156.

During the evacuation step of bed 140, a portion of the evacuated gas is used as product, while a second portion is recycled as rinse to a rinsing bed. The nitrogen product, preferably having a purity of 95% and having a maximum purity of 99.9%, can be removed in line 160 and, if product specifications require, compressed in compressor 162 and delivered via line 164 to a switching series of desiccant beds 166 and 168 for removal of water wherein the ultimate nitrogen product delivered via line 170 is removed as a pressurized, dry, nitrogen gas 172. A recycle line 174 allows any nitrogen product used to regenerate beds 166 and 168 to be recovered. These beds may be regenerated in any of the known techniques as fully described with reference to the embodiment of FIG. 1 above.

After the fixed time evacuation of bed 140 is completed, the bed is at its lowest pressure level at a subambient condition, preferably of 150 torr. It is now necessary to repressurize bed 140 to bring it to feed conditions. Bed 140 is repressurized with oxygen enriched effluent introduced countercurrently through open value 124 via line 136 and open valve 128, which allows pressure equalization between the vacuum condition of bed 140 and the repressurized condition of bed 144. Accordingly, air 108 is introduced through open valve 109 and manifold 110 via open valve 120 through bed 144, which is presently on ambient air feed and the resulting oxygen rich effluent passes to bed 140 by the driving force of pressure equalization between the high pressure bed 144 and the vacuum pressure bed 140. After a fixed time interval which is calculated to avoid nitrogen breakthrough in bed 144 and to provide for approximately full repressurization of 140, the repressurization step is discontinued and bed 140 exists in an idle step having no active function for a fixed time prior to returning to the above-described ambient air feed step.

This completes the description of a full cycle sequence for bed 140 and it can be appreciated that each of the beds 140, 142 and 144 go through a similar sequence of steps commensurate with the cycle sequence illustrated in FIG. 3A to provide a continuous process as will be more fully appreciated from review of the valve chart for the alternate embodiment of FIG. 2 set forth in Table 2 below.

subatmospheric pressure at the end of step (c) with the effluent end of another of said plurality of beds presently undergoing the ambient air adsorption of step (a), and (e) continuing this series of steps with the plurality of beds to form a continuous process for production of high purity nitrogen.

2. The process of claim 1 wherein the rinse gas recovered from one bed undergoing step (c) is directly used as the rinse gas of another bed undergoing step (b).

TABLE 2

| BED STEP | | | Three Bed Valve Sequence (FIG. 2) VALVES | | | | | | | | | | |
|---|---|---|---|---|---|---|---|---|---|---|---|---|---|
| 1 | 2 | 3 | 112 | 114 | 124 | 116 | 118 | 126 | 120 | 122 | 128 | 109 | 132 |
| 0–45 | AF | EVAC | REP | O | C | O | C | O | C | C | C | O | O | C |
| 46–60 | RINSE | EVAC | IDLE | O | C | O | C | O | C | C | C | O | C | O |
| 60–105 | EVAC | REP | AF | C | O | C | C | C | O | O | C | O | O | C |
| 105–120 | EVAC | IDLE | RINSE | C | O | C | C | C | O | O | C | O | C | O |
| 120–180 | REP | AF | EVAC | C | C | O | O | C | O | C | O | C | O | C |
| 165–180 | IDLE | RINSE | EVAC | C | C | O | O | C | O | C | O | C | C | O |

O = Valve Open
C = Valve Closed

The improved process of the present invention dispenses with much of the hardware and power requirements of the prior art in providing a vacuum swing adsorptive separation of ambient air to produce a high purity nitrogen product. By further downstream processing, this high purity nitrogen product can be set to desired product pressure specifications and dried for those end uses which require such contaminant removal. The overall effect of the present process with its avoidance or reduction of surge tank requirements for products and by-products and the absence of a feed air blower or compressor, is at least a 3% reduction in capital investment in such a plant and a 5% to 13% reduction in power consumption based upon a 30,000,000 scf/hr plant size producing dry 99.5% nitrogen at 100 psig. In addition, the use in the present process of a single adsorption bed per parallel train rather than a pretreatment bed and a main bed for removal of water, carbon dioxide and oxygen reduces capital cost of the process equipment while increasing production and simplifying cycle sequence by allowing single beds to be operated without dissimilar regeneration treatment.

The process of the present invention has been set forth with reference to several preferred embodiments, but the full scope of the invention should be ascertained from the claims which follow:

We claim:

1. A process for the production of high purity nitrogen from air using a plurality of parallel adsorption beds which comprises:

(a) drawing ambient air through the feed end of a first bed of adsorbent by connecting the effluent end of said bed to the effluent end of a parallel bed, which is presently fully evacuated, so as to selectively adsorb nitrogen on said first bed of adsorbent and allow oxygen to pass through said first bed;

(b) cocurrently rinsing said first bed with high purity nitrogen to remove any co-adsorbed oxygen and void space oxygen from said bed;

(c) countercurrently evacuating said first bed to a subatmospheric pressure to recover a high purity nitrogen product and a rinse gas for another of said plurality of beds presently undergoing step (b);

(d) countercurrently repressurizing said first bed by connecting the effluent end of said first bed at its 3. The process of claim 1 wherein any water and carbon dioxide contained in the ambient air is adsorbed in an initial portion of the adsorbent of said plurality of beds.

4. The process of claim 3 wherein each adsorbent bed contains an adsorbent selective for water and carbon dioxide in the initial portion of the bed adjacent to the influent end and an adsorbent selective for nitrogen in the remainder of the bed.

5. The process of claim 1 wherein the bed undergoing step (d) repressurization is repressurized to a pressure of approximately 14.7 psia.

6. The process of claim 1 wherein step (a) ambient air feed is conducted over a pressure variation from approximately 12.7 psia to approximately 14.7 psia.

7. The process of claim 1 wherein evacuation step (c) is conducted to a pressure of approximately 50–250 torr.

8. The process of claim 1 wherein the nitrogen product has a purity of at least 95.0%.

9. The process of claim 1 wherein the nitrogen product has a purity of approximately 99.9%.

10. The process of claim 1 wherein four parallel beds are utilized.

11. The process of claim 10 wherein nitrogen recovered in step (c) evacuation is supplied to a nitrogen storage vessel.

12. The process of claim 1 wherein each of the steps (a) air feed, (b) rinse, (c) evacuation and (d) repressurization is conducted in an equal period of time.

13. The process of claim 1 wherein an idle step follows the repressurization step in which said first bed is not involved in active operation.

14. The process of claim 13 wherein three parallel beds are utilized.

15. The process of claim 13 wherein the total of step (a) ambient air feed and step (b) rinse are of the same time duration as the step (c) evacuation and the total of step (d) repressurization and said idle step are also of the same time duration as the step (c) evacuation.

16. The process of claim 13 wherein nitrogen recovered in step (c) evacuation is supplied to a nitrogen storage vessel.

17. The process of claim 1 wherein a portion of the oxygen passing through said first bed of step (a) is recovered as an oxygen-enriched product.

* * * * *